United States Patent
Ngo et al.

(10) Patent No.: US 7,215,748 B2
(45) Date of Patent: *May 8, 2007

(54) METHODS AND SYSTEMS FOR DEFINING AND DISTRIBUTING DATA COLLECTION RULE SETS AND FOR FILTERING MESSAGES USING SAME

(75) Inventors: Hien D. Ngo, Dallas, TX (US); Aziz A. Tejani, Plano, TX (US); Joseph Yu-Lung Wan, Richardson, TX (US); Mohammad Farooq, Plano, TX (US); David K. Noden, Richardson, TX (US)

(73) Assignee: Tekelec, Morrisville, NC (US)

( * ) Notice: Subject to any disclaimer, the term of this patent is extended or adjusted under 35 U.S.C. 154(b) by 344 days.

This patent is subject to a terminal disclaimer.

(21) Appl. No.: 10/317,353

(22) Filed: Dec. 12, 2002

(65) Prior Publication Data

US 2004/0114741 A1     Jun. 17, 2004

(51) Int. Cl.
*H04M 15/00* (2006.01)
(52) U.S. Cl. ............ 379/133; 379/112.01; 379/134; 379/32.01
(58) Field of Classification Search ........... 379/32.01, 379/32.03, 112.01, 133–134, 229–230, 221.03, 379/112.05, 112.08, 112.1, 116, 126, 137, 379/139
See application file for complete search history.

(56) References Cited

U.S. PATENT DOCUMENTS

| 5,008,929 | A | | 4/1991 | Olsen et al. |
| 5,438,570 | A | | 8/1995 | Karras et al. |
| 5,488,648 | A | * | 1/1996 | Womble ...................... 379/13 |
| 6,233,313 | B1 | * | 5/2001 | Farris et al. ........... 379/112.01 |
| 6,249,572 | B1 | | 6/2001 | Brockman et al. |
| 6,298,123 | B1 | | 10/2001 | Nolting et al. |
| 6,327,350 | B1 | | 12/2001 | Spangler et al. |
| 6,359,976 | B1 | | 3/2002 | Kalyanpur et al. |
| 6,381,306 | B1 | | 4/2002 | Lawson et al. |
| 6,483,842 | B1 | | 11/2002 | Mauger |
| 2002/0150221 | A1 | | 10/2002 | Carson et al. |

OTHER PUBLICATIONS

International Search Report in PCT Application No. 03/38479 (Oct. 6, 2004).

* cited by examiner

*Primary Examiner*—Quoc Tran
(74) *Attorney, Agent, or Firm*—Jenkins, Wilson, Taylor & Hunt, P.A.

(57) ABSTRACT

Methods and systems for defining and distributing network data collection rule sets and for filtering messages using the rule sets are disclosed. Message-based filter criteria are automatically deduced from CDR-based filter criteria and downloaded to site collectors. The site collectors implement rule changes on-the-fly using a table-driven system. The message-based rule sets downloaded to the site collectors are supersets of the messages required by multiple different network monitoring applications. As a result, non-redundant, multi-application data streams are sent across the service provider's internal network, resulting in efficient bandwidth utilization.

39 Claims, 6 Drawing Sheets

METHODS AND SYSTEMS FOR DEFINING AND DISTRIBUTING DATA COLLECTION RULE SETS AND FOR FILTERING MESSAGES USING SAME

TECHNICAL FIELD

The present invention relates to methods and systems for defining and distributing data collection rule sets. More particularly, the present invention relates to methods and systems for defining and distributing data collection rule sets and for filtering messages using the rule sets.

BACKGROUND ART

In network data collection systems, such as telecommunications data collection systems, signaling messages of interest are filtered and distributed to external applications, such as billing applications, fraud detection applications, etc., for further processing. Many of these applications require common information from received signaling messages. However, conventional network data collection systems require a separate message or call detail record (CDR) feed for each application from the data collection location, across the service provider's network, to the data processing location, even when parameters or messages required by various applications are common. Sending duplicates of message parameters in different feeds for different applications wastes bandwidth in the network in which the network data collection system operates. In some instances, this network is the same network used to provide internal communications services, such as corporate intranet services and email. Accordingly, this wasting of bandwidth can adversely affect communications in a telecommunications service provider's internal network.

Another problem related to network data collection is defining and distributing data collection filters to the machines that actually filter the messages. In conventional network data collection systems, filter definition is static, meaning that new filter criteria for a given application must be created by a skilled programmer, compiled, and downloaded to the individual filtering elements. Network data collection service is disrupted in order for the new filter criteria to be installed. For billing applications, disrupting network data collection service can be costly for a service provider. In addition, if the newly compiled filter criteria do not work properly the first time, the process of modifying the source code, recompiling the code, and downloading the compiled code to the filter elements must be repeated. This process further increases the cost of making changes to filter criteria.

Yet another problem associated with conventional network data collection systems is defining filtering rule sets. Defining filtering rule sets at the message or parameter level can be tedious in light of the number of different kinds of messages required by a given application and the number of parameters in each message type. Thus, manually creating rule sets at the message or parameter level is labor intensive and subject to human error.

Accordingly, in light of these difficulties associated with conventional network data collection systems, there exists a long felt need for improved methods and systems for defining and distributing network data collection rule sets and for filtering messages using the rule sets.

DISCLOSURE OF THE INVENTION

The present invention includes improved methods and systems for defining and distributing network data collection rule sets and for filtering messages using the rule sets.

According to one aspect, the invention includes a method for decreasing bandwidth consumed by a network data collection system by sending non-redundant, multi-application message streams from network site collectors to a data gateway server. According to this method, message filter rule sets for a plurality of different applications are downloaded to the site collectors. The rule sets define the types of messages required by the various applications. The rule sets also define parameter rules for the various applications. For example, an application may require all ISUP messages with a particular OPC/DPC combination. For session initiation protocol (SIP) messages, an application may require all (SIP) messages having a particular session identifier. For H.225 and media gateway control protocol (MGCP) messages, an application may require all messages having a particular call reference value. The site collectors filter messages based on the rule sets. The site collectors each forward non-redundant, multi-application message streams to the data gateway server. The data stream is non-redundant such that when a message is required by multiple applications, only a single copy of the message is sent across the service provider WAN. The data gateway server creates a common call detail record for use by the different applications. Because the site collectors send non-redundant, multi-application MSU streams to the data gateway server, network bandwidth usage is minimized.

The types of messages filtered by the site collectors may include SS7 MSUs, H.225 messages, SIP messages, MGCP messages, or SS7 messages carried over TCP/IP or SCTP/IP. Filtering any type of traditional telephony, wireless telephony, or IP-telephony signaling messages is intended to be within the scope of the invention. In addition, although the present invention will be described in terms of sending non-redundant message streams across a service-provider's WAN, it is understood that bandwidth may be further conserved by only sending parameters of interest from the messages across the network. Accordingly, the term "messages," as used herein, is not limited to any particular signaling message type and is intended to include complete messages as well as parts of messages.

According to another aspect, the present invention includes a method for defining and dynamically updating message filters associated with different site collectors in a network data collection system. The method includes filtering MSUs or other types of signaling messages at a plurality of site collectors based on existing rule sets defined in the site collectors. A user may enter a rule change or a new rule set at an administration server located remotely from the site collectors. The user enters the rule set in terms of the CDRs needed by the applications. The administration server automatically converts the CDR-based filter criteria into MSU- or other message-based filter criteria. The MSU or other message-based rule set is then distributed to the site collectors. The site collectors begin using the new rule set without stopping the filtering of MSUs. Because the site collectors can immediately begin using the new rule sets, system down time is decreased.

Accordingly, it is an object of the invention to provide improved methods and systems for defining and distributing network data collection rule sets.

It is another object of the invention to provide improved methods and systems for filtering messages using the rule sets.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
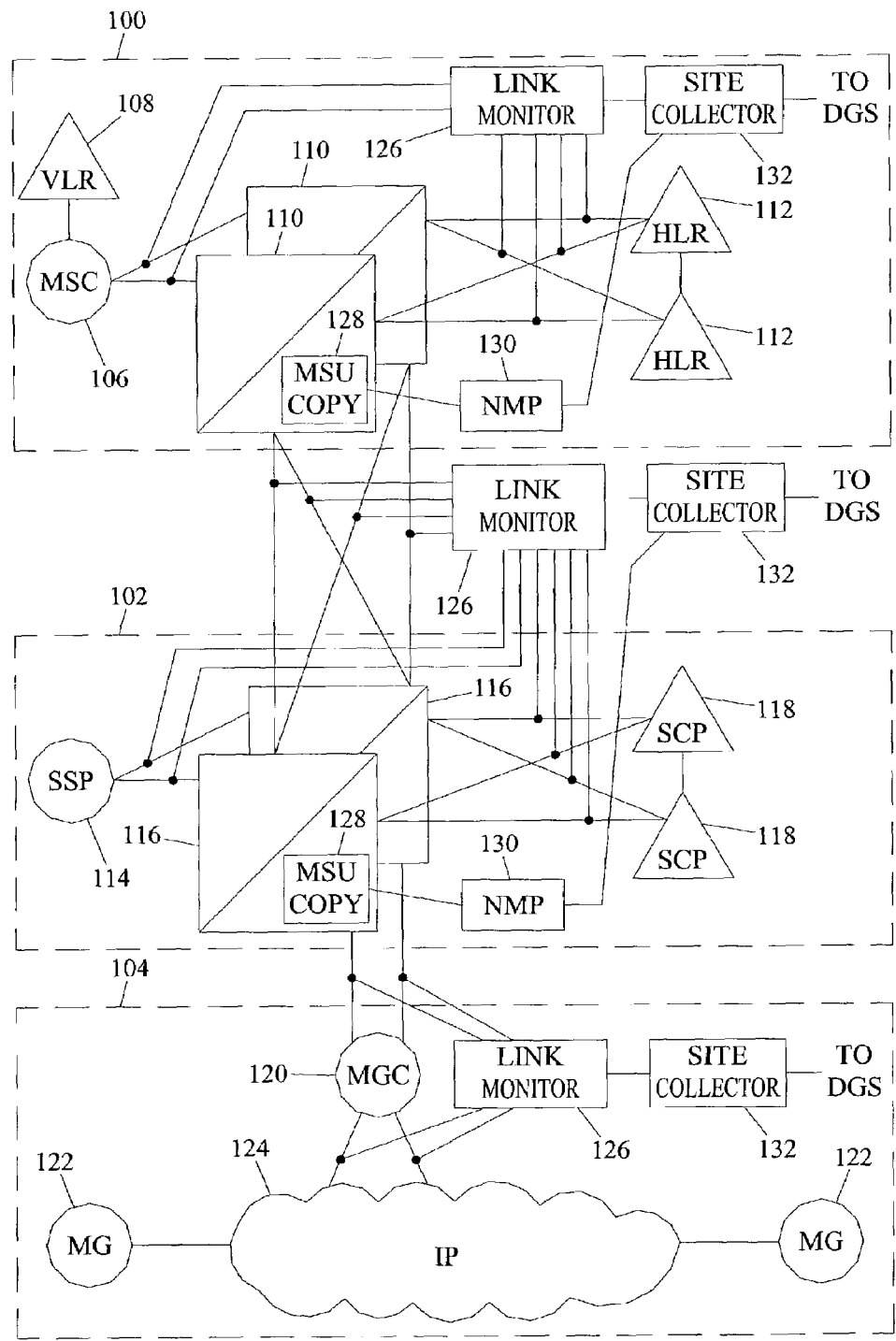
FIG. 1 is a block diagram of an exemplary telecommunications network in which the methods and systems of the present invention may operate.

The present invention includes methods and systems for defining and distributing network data collection rule sets and for filtering messages using the rule sets. FIG. 1 illustrates an exemplary telecommunications network for which the rule sets according to the present invention may be defined. Referring to FIG. 1, an exemplary telecommunications network includes various entities that generate and route signaling messages. In the illustrated example, the network includes a wireless component 100 for generating and routing signaling messages associated with wireless telecommunications, a wireline component 102 for generating and routing signaling messages associated with wireline communications, and an IP telephony component 104 for generating and routing signaling messages associated with IP telephony communications. Wireless component 100 includes a mobile switching center 106, a VLR 108, an STP pair 110, and an HLR pair 112. Mobile switching center 106 originates and terminates calls to and from mobile subscribers. Visitor location register 108 is a database that stores information regarding subscribers roaming in a particular network. Signal transfer points 110 route signaling messages between other network entities. Home location registers 112 store subscriber records and subscriber location information.

Wireline component 102 includes a service switching point 114, an STP pair 116, and an SCP pair 118. Service switching point 114 originates and terminates calls to and from wireline subscribers. STP pair 116 routes signaling messages between other network entities. SCP pair 118 are databases that store data relating to telephony services, such as LIDB, calling name service, number portability, etc.

IP component 104 includes a media gateway controller 120 and media gateways 122. Media gateway controller 120 controls media gateways 122 to set up calls between end users via IP network 124. Media gateways 122 handle media stream communications between end users.

In order to collect messages in the network illustrated in FIG. 1, a plurality of link monitors 126 may be connected to signaling links at various locations in the network. Link monitors 126 may include link probes that connect to external signaling links that interconnect network elements. For example, if a link monitor 126 is co-located with an STP pair, the link monitor 126 may be connected to signaling links terminated by the STP pair. Exemplary commercially available link monitors suitable for use with embodiments of the present invention are the i2000 and i3000 shelves available from Tekelec of Calabasas, California. Briefly, these link monitors include external link probes that nonintrusively copy signaling messages from signaling links. The link monitors connect to a shelf including a plurality of link interface controllers that interface directly with the link probes and link interface modules that run various link monitoring and traffic simulation applications.

In addition to external link monitors 126, internal link monitors 128 and associated network monitoring processors 130 may be used to copy signaling messages from within network monitoring nodes, such as STPs, without the use of external probes. An example of a probeless network monitoring system is described in commonly-assigned, copending U.S. patent application Ser. No. 10/164,226, filed on Jun. 5, 2002, the disclosure of which is incorporated herein by reference in its entirety. Briefly, this network monitoring system includes MSU copy functions located on link interface cards within signal transfer points. The signal transfer points also include network monitoring transport cards that transport messages copied from signaling links to network monitoring processors 130 located external to the signal transfer points. Network monitoring processors 130 store copied signaling messages and forward the signaling messages to downstream network monitoring applications.

A plurality of site collectors 132 collect signaling messages copied from both internal and external link monitors. Because site collectors 132 may be co-located with the link monitors and are usually located on the same local area network, bandwidth utilization between site collectors 132 and link monitors 126 is not of extreme concern. However, site collectors 132 must communicate signaling message information downstream network monitoring applications, and these applications are typically not co-located with site collectors 132. Thus, it is preferable to minimize bandwidth usage between site collectors 132 and downstream network monitoring applications. Accordingly, rather than forwarding complete copies of all messages received from the link monitors, site collectors 132 forward only those parameters required by the common call detail record. The common call detail record contains a superset of the parameters required by all of the applications. Parameter duplication is thus avoided. Sending such parameter streams results in optimal use of bandwidth in a service provider's internal network.

Figure 2:
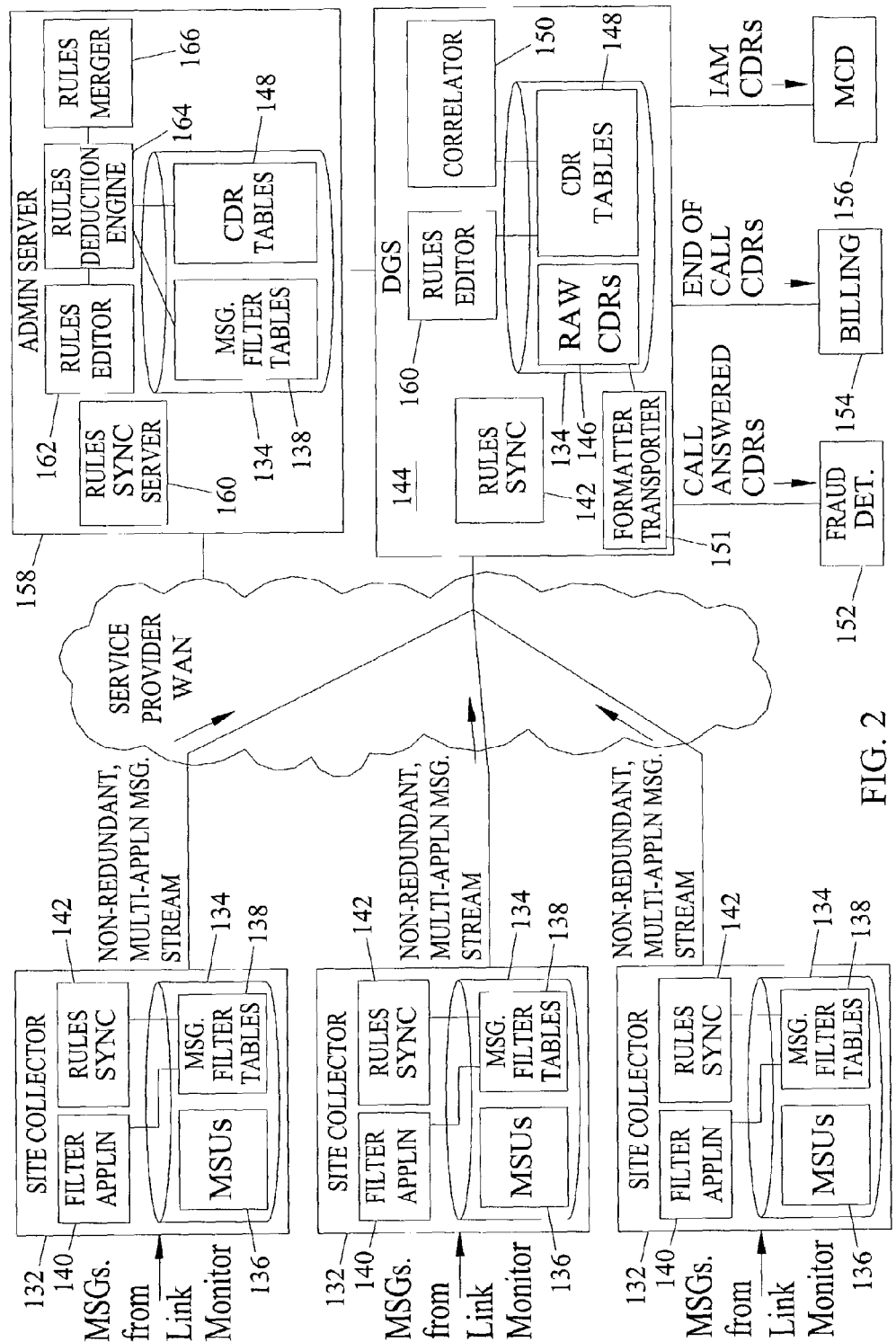
FIG. 2 is a block diagram of a system for defining and distributing network data collection rule sets and for filtering messages using the rule sets according to an embodiment of the present invention.

FIG. 2 illustrates a system for defining and distributing network data collection rule sets and for filtering messages using the rule sets according to an embodiment of the present invention. In FIG. 2, site collectors 132 each receive messages copied by internal and external link monitors 126 and 128 illustrated in FIG. 1. Site collectors 132 include a database 134 for storing messages 136 received from the link monitors. In addition, databases 134 include filter tables 138 for storing filtering rules for filtering messages. Each site collector 132 also includes a filter application 140 for filtering message parameters based on the rules in filter tables 138. A rules synchronization application 142 associated with each site collector 132 retrieves new network monitoring rules and updates the parameter filter tables on-the-fly without ceasing the flow of network monitoring messages. These functions will be described in more detail below.

According to an important aspect of the invention, filter tables 138 associated with each site collector 132 are structured such that each site collector 132 delivers a non-redundant, message stream to a data gateway server 144. The non-redundant message stream contains messages required by a common CDR. The common CDR contains a superset of the message parameters required by applications served by data gateway server 144. Data gateway server 144 may use the data in the common CDR to create one or more application data feeds based on user-specified parameters.

In the illustrated example, data gateway server 144 includes a database 134 for storing unformatted CDRs 146, referred to as raw CDRs, and CDR filter tables 148 for creating the application data feeds. CDR filter tables 148 may be generated based on user-defined parameters. Data gateway server 144 also includes a correlator 150 for correlating messages into different CDR types (e.g., end of call, call duration, etc.) using the data stored in CDR filter tables 148. A formatter/transporter 151 converts the CDRs into ASCII format and creates the application data feeds. Finally, data gateway server 144 includes a rules synchronizer 142 for obtaining and updating CDR rules in CDR tables 148.

As stated above, data gateway server 144 creates application data feeds for a plurality of different applications. In the illustrated example, these applications include a fraud detection application 152, a billing application 154, and a mass call detection application 156. Applications 152, 154, and 156 may be located on servers external to data gateway server 144. Alternatively, these applications may be resident on data gateway server 144.

An administration server 158 contains the master copies of message filter tables 138 and CDR filter tables 148. Administration server 158 includes a rules synchronization server 160 for distributing filter rule changes to site collectors 132 and to data gateway server 144. Administration server 158 also includes a rules editor 162 for allowing end users to edit and define rules and a rules deduction engine 164 for automatically deducing message-based parameters from CDR-based filter criteria. A rules merger 166 automatically determines the superset of rules required by the various applications and merges the rules for the various applications into a combined rule set to avoid message redundancy.

According to an important aspect of the invention, data collection rule sets are automatically downloaded to site collectors 132 and implemented on-the-fly without requiring the cessation of filtering. In addition, new rules are merged with existing rules such that the rule set used by each site collector to filter messages collects a non-redundant superset of the messages required by the various applications. This operation will now be described in detail.

Figure 3:
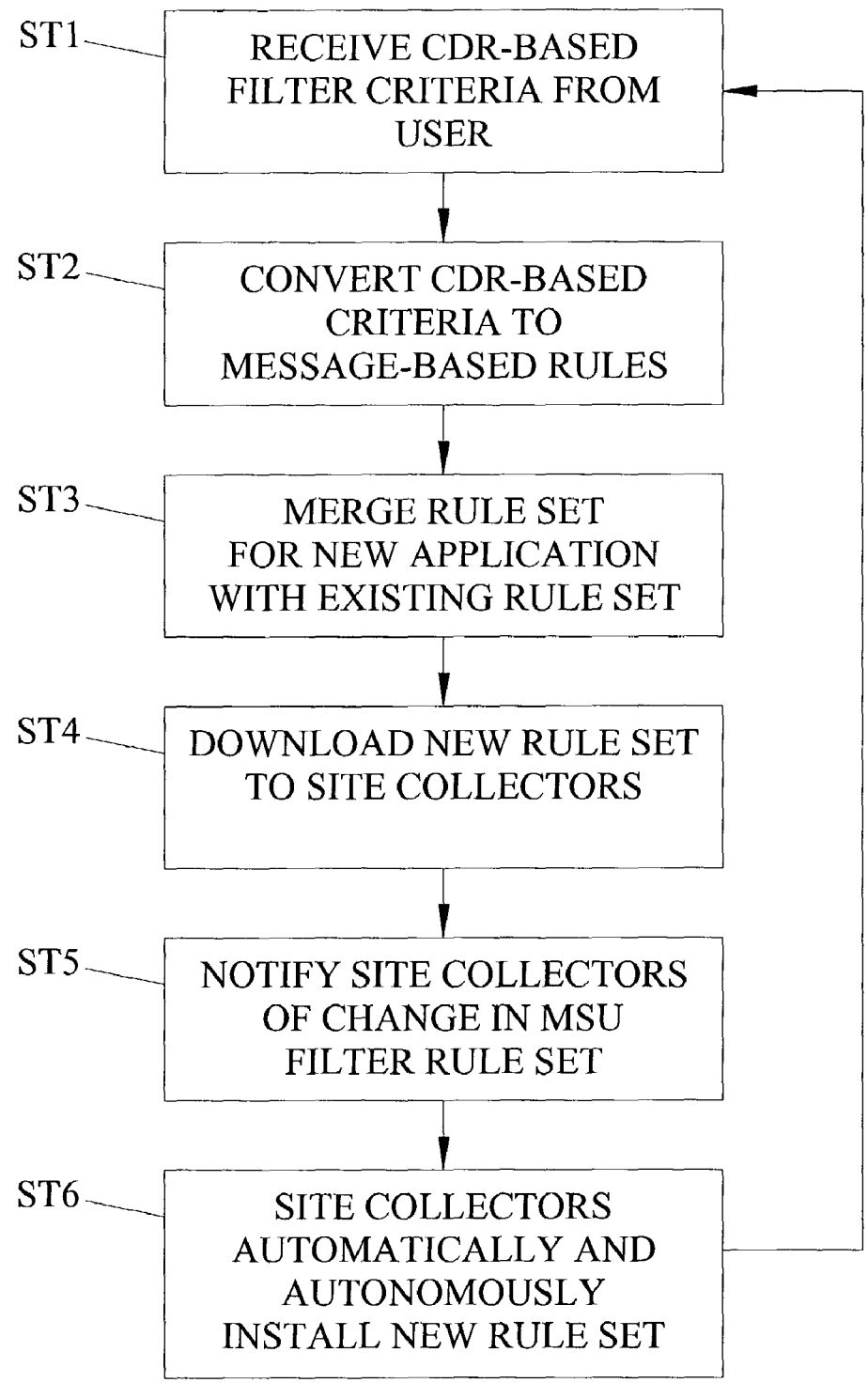
FIG. 3 is a flow chart illustrating exemplary steps that may be performed by an administration server in defining and distributing network data collection rule sets according to an embodiment of the present invention.

FIG. 3 is a flow chart illustrating exemplary steps that may be performed by administration server 158 in defining, merging, and distributing rule sets. Referring to FIG. 3, in step ST1, administration server 158 receives CDR-based filter criteria from a user. For example, if the user is operating a mass call detection application, the user may request IAM CDRs addressed to a particular calling party number. If the user is operating a billing application, the user may request end-of-call CDRs which contain parameters from the complete sequence of ISUP messages from a call. If the user is operating a fraud detection application, the user may request call answered CDRs, which include all ISUP messages until and including the time when a user answers a call.

In step ST2, rules deduction engine 164 on administration server 158 automatically deduces message-based filter criteria from the CDR-based filter criteria. For example, for end-of-call ISUP filter parameters, an ISUP filter may start out with a set of default filter conditions prescribed by a generic ISUP CDR, where the CDR includes a predetermined set of ISUP messages with specific parameters that are allowed to pass the filter. Then, additional ISUP MSU filter conditions may be deduced from the CDR rules. For example, one ISUP-based filtering rule may be IAM_direction=incoming/outgoing, where the user specifies the direction of the IAM messages to be filtered as incoming or outgoing. From the direction specified in the IAM rule, rules deduction engine 164 may automatically determine that ANM and ACM messages are to have the opposite direction value of the IAM direction value. For example, if the IAM is incoming, the ANM and ACM filter criteria must be outgoing. Rules deduction engine 164 may duplicate the OPC for each IAM criteria and use the OPC parameter as the DPC parameter for ANM and ACM filter criteria. Rules deduction engine 164 may discard CDR rule conditions involving calling party number for MSU filtering, because this parameter is found only in the IAM message and not in the release or release complete messages. Thus, because rules deduction engine 164 is capable of automatically deducing certain rules based on other rules specified by the user, the time and complexity involved in defining network data collection rules are decreased.

For TCAP CDR-to-MSU filter deduction, rules deduction engine 164 may start with a set of default filter conditions prescribed by the LIDB CDR. Since a LIDB transaction is a TCAP transaction, only certain TCAP messages and particular parameters within the messages will be allowed to pass the filter. Additional criteria are then added to the default filter of criteria based on the CDR rules. In order to create a TCAP MSU rule set from a TCAP CDR rule set, rules deduction engine 164 may use the following rules:
1. The CDR rule parameter query direction=incoming/outcoming applies to the TCAP query verbatim. The TCAP response is to have the opposite value of the query's direction value. For example, if the query is incoming, the response is outgoing.
2. Every CDR rule condition is duplicated verbatim for the TCAP query.
3. Every CDR rule condition is duplicated for the TCAP response.

However, the OPC and DPC parameters are interchanged. For example, if the CDR rule is for OPC the condition is translated to DPC for the TCAP response.

Thus, rules deduction engine 164 may automatically deduce message-based filter criteria from CDR-based filter criteria. As a result, the rules definer is not required to have detailed knowledge of message parameters required for a particular CDR.

Returning to FIG. 3, in step ST3 rules merger 166 merges the rule set for the new application with the existing rule set. This step is preferably performed so that MSU stream sent from each site collector is non-redundant. For example, if data gateway server 144 serves a mass call detection application and a billing application that both require IAM messages directed to the same called party, only a single copies of these IAM messages are sent from site collectors 132 to data gateway server 144. In one embodiment, the MSU-based filtering rules may be stored as rule conditions joined by logical connectors. An example of a CDR-based filtering rule set is as follows:

```
For ISUP CDR Output { CDRTypes = answeredCall longDurationCall
endOfCall }
    If CDR.DPC is not in ILECNetworks
    AndIf CDR.DPC is not in CLECNetwork
    AndIf CDR.calledPartyNumber is not in 800Numbers
    Then
        Output CDR
    EndIf
EndFor
```

In the example rule set, CDR-based parameters are specified. These rule sets would be converted to MSU-based rules joined by the logical connectors ANDIF and ORIF. For example, rules deduction engine 164 may interpret the rule "If CDR.DPC is not ILECNetworks" as "If IAM.DPC is not ILECNetworks." Such automatic logical deduction of MSU-based filter parameters simplifies rules definition from an end user perspective.

When rules merger 166 receives multiple conditions, rules merger 166 takes the logical AND of all AND-based conditions and the logical OR of all OR-based conditions. For example, if two different rule sets are:
1. <condition1>ANDIF<condition2>ORIF<condition3>
2. <condition1>ORIF<condition4>, the combined rule set would be:
<condition1>ANDIF<condition2>ORIF<condition3> ORIF<condition4>It should be noted that <condition1> is not repeated, so that only one copy of each message parameter satisfying <condition1> is sent to data gateway server 144. This combining of conditions will result in a combined rule set that is the superset of all rules required by the various applications. As a result, bandwidth in the service provider's internal network is conserved.

Correlator 150 on data gateway server 144 will then create a common CDR for use by applications using the same message parameters. Because the rule sets downloaded to site collectors 132 produce non-redundant, multi-application message streams, bandwidth in the service provider wide area network is conserved.

Returning to FIG. 3, in step ST4, once the rule set is merged, administration server 158 downloads the new rule sets to the site collectors. Once the new rule set is downloaded, a flag is set in database 134 indicating that the rule set has changed (step ST5). In step ST6, each site collector detects the flag and automatically installs the new rule set Thus, as illustrated in FIG. 3, the present invention includes converting CDR-based rules to message-based rules and merging rule sets so that data streams from the site collectors are non-redundant.

Figure 4:
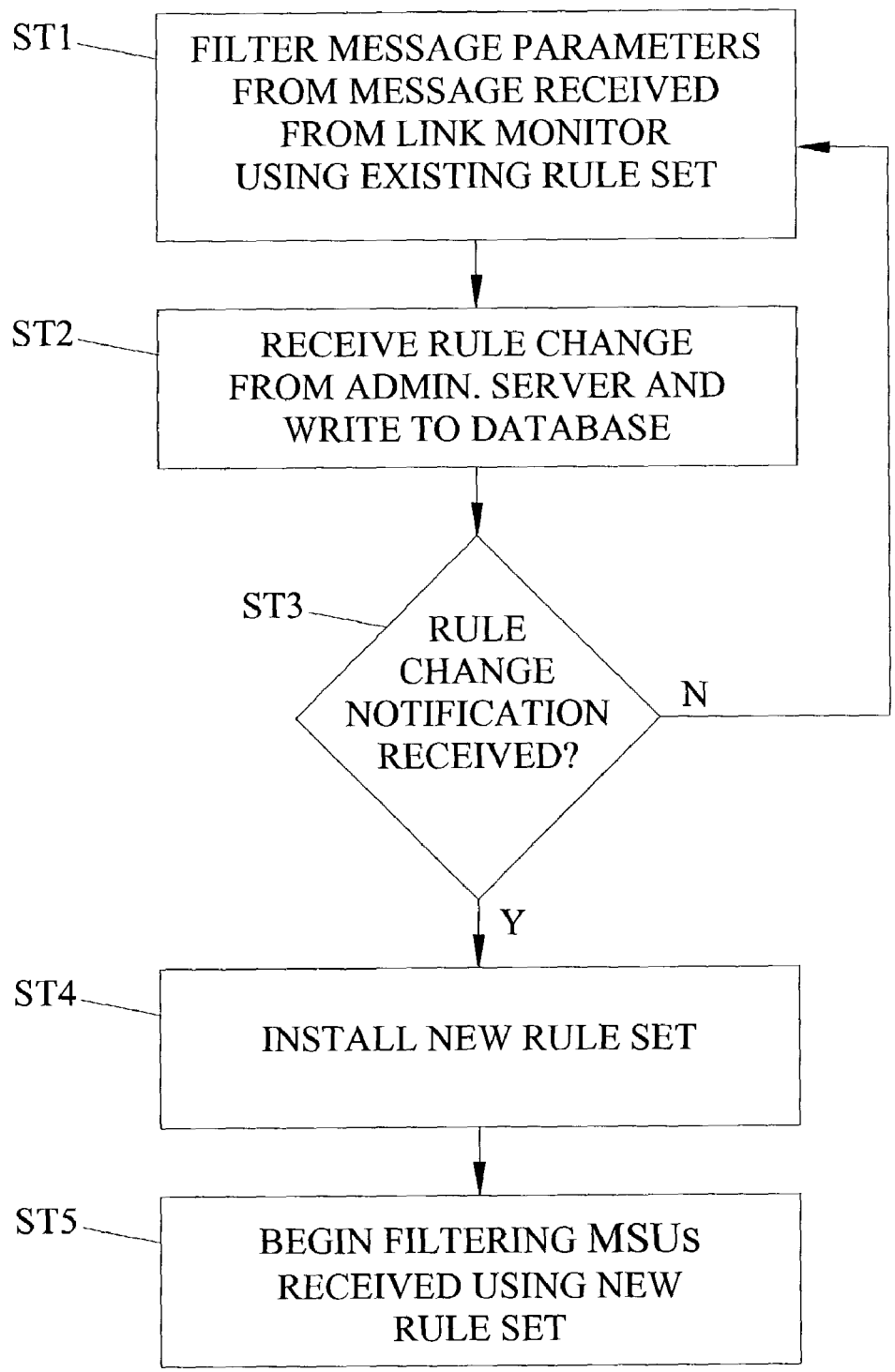
FIG. 4 is a flow chart illustrating exemplary steps that may be performed by a site collector in requesting, receiving, and implementing rule changes on the fly without ceasing filtering of messages.

Another aspect of the invention is the ability of the site collectors to automatically install rule changes on the fly without stopping the filtering of messages. FIG. 4 illustrates exemplary steps that may be performed by site collectors 132 in detecting rule changes, automatically installing these changes on-the-fly. Referring to FIG. 4, in step ST1, site collectors 132 filter messages and message parameters from the messages received from link monitors using an existing rule. The existing rule set is the rule set stored in filter tables 138. In step ST2, site collectors 132 receive the rule set from administration server 158 and write the rule set to database 134. In step ST3, site collectors 132 determine whether a rule change notification has been received. This step may be performed by polling the memory location where the change notification flag is written. If no change notification has been received, site collectors 132 continue filtering using the existing rule set. In step ST4, site collectors 132 install the rule set. In step ST5, site collectors 132 begin filtering messages using the new rule set. Because the parameter filtering performed by site collectors 132 is table-driven, rules can be updated on the fly without stopping the flow of messages. As a result, the time required to implement rule changes is decreased and service provider revenue is not lost due to down time.

Figure 5:
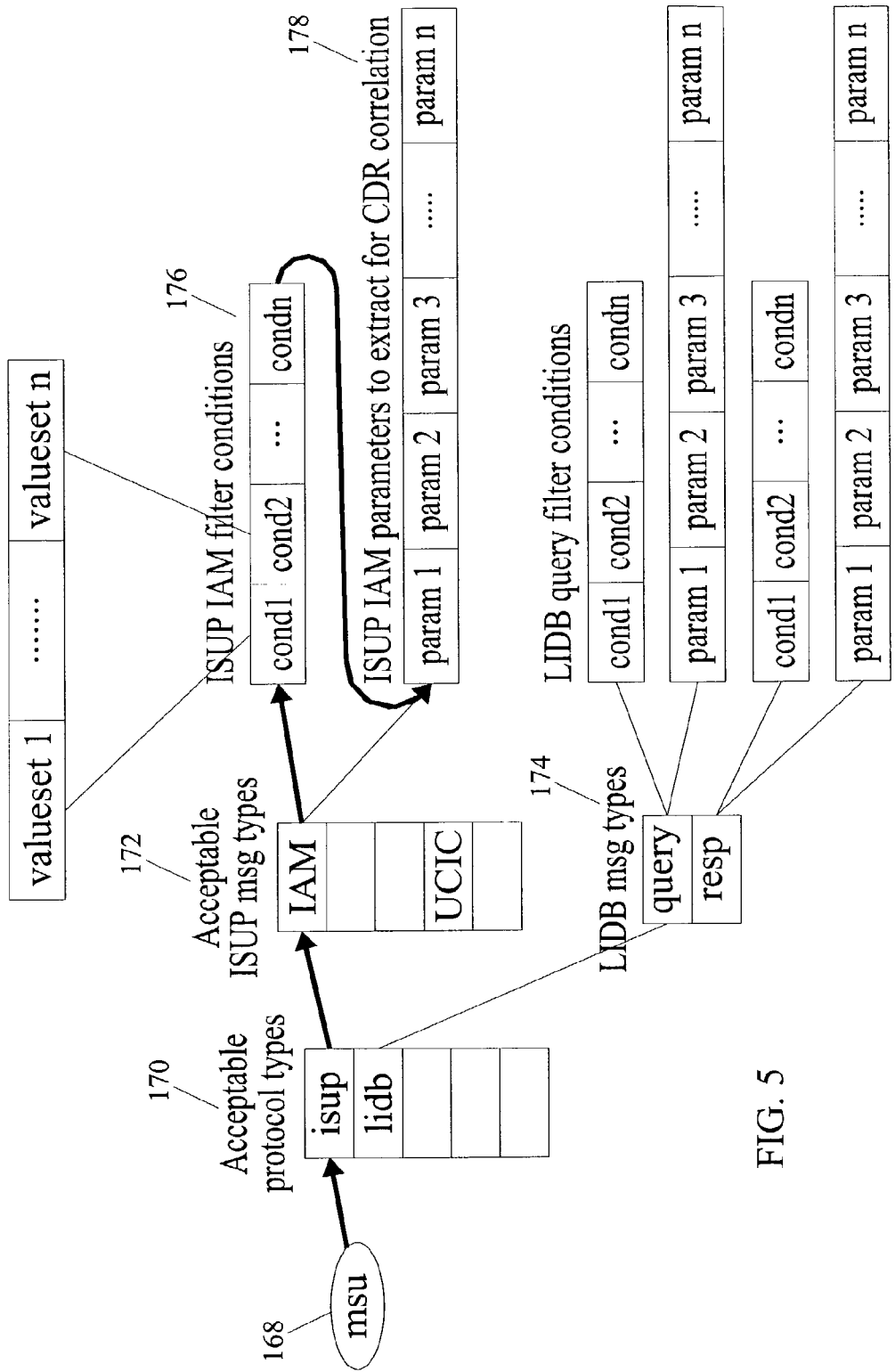
FIG. 5 is a block diagram of an MSU rule set that may be used by a site collector according to an embodiment of the present invention.

FIG. 5 illustrates an example of an MSU-based filter rule set that may be implemented by site collectors 132. In the illustrated example, the rule set includes a collection of tables that define filter criteria. In FIG. 5, control proceeds from left to right where the MSU must traverse the filters from left to right in order to pass the filter conditions. Referring to FIG. 5, an MSU 168 stored in database 136 is presented to the filter table. A first filter table 170, defines acceptable protocol types. In the particular example, the acceptable protocol types are ISUP and LIDB. If the MSU is one of the acceptable protocol types, filter criteria in table 172 are applied to determine whether the message is one of the accepted message types. In the illustrated example, the accepted message types are IAM and UCIC. In this example it is assumed that the message is an IAM message. If the message had been a LIDB message, the filter criteria in table 174 would have been applied to determine acceptable LIDB parameter filter conditions. Once the message is determined to be one of the acceptable ISUP message types, the filter criteria in table 176 are applied to determine whether the IAM message passes the filter conditions. For example, these conditions may include IAM messages to or from a particular point code. If the message passes IAM condition filtering, parameter-based criteria stored in table 178 are applied to extract the particular parameters needed for CDR correlation by all of the applications. Because only parameters of interest to the applications are extracted from the IAM message, this step further reduces the bandwidth consumed in the service provider's wide area network.

Once the messages are correlated into raw CDRs 136 by data gateway server 144, the raw CDRs 136 are stored in database 134. Formatter/Transporter 151 converts the raw CDRs into ASCII-formatted CDRs.

Figure 6:
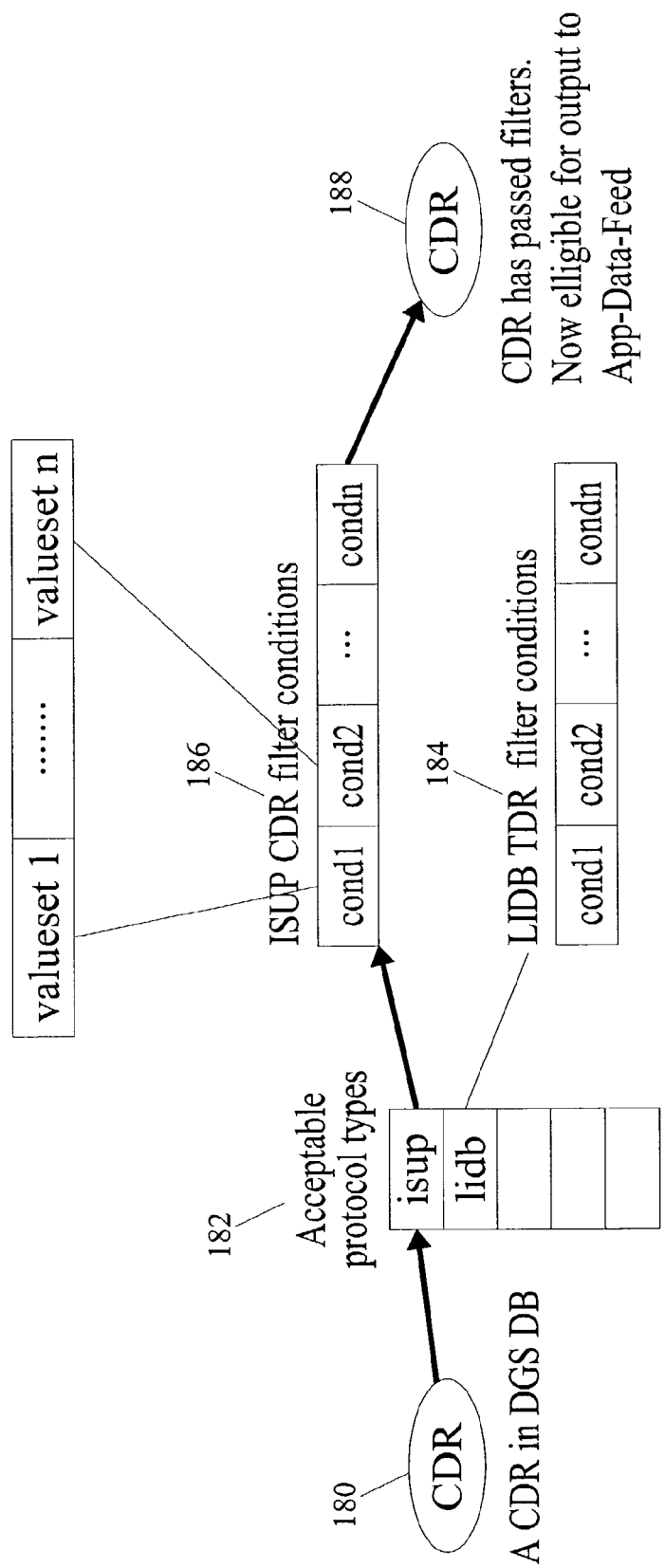
FIG. 6 is a block diagram of a CDR filter rule set that may be used by a data gateway server according to an embodiment of the present invention.

The ASCII-formatted CDRs may include a single common or super CDR containing all of the messages required by all of the applications as well as CDRs containing subsets of the messages, as required by different protocols or applications. Filter tables 134 may control the content of the CDRs created by data gateway server 144. FIG. 6 illustrates an example of filter tables that may be stored in database 134. In FIG. 6, a CDR 180 is compared to criteria in a first table 182 to determine whether the CDR contains acceptable protocol types. In this example, the protocol types are ISUP and LIDB. If the message is a LIDB message, LIDB filter conditions in table 184 are applied to the CDR. If the CDR is an ISUP CDR, ISUP filter conditions in table 186 are applied. In this example, it is assumed that the CDR is an ISUP CDR. Once the application specific ISUP filter conditions in table 186 are applied, a CDR 188 is created and forwarded to the external application. Filter criteria, such as those illustrated in FIG. 6, may be applied to the CDRs in database 134 for each application. Formatter/transporter 151 may create a single feed for multiple applications or different feeds for different applications.

Although in the embodiment illustrated in FIG. 2, rules deduction engine 164 and rules merger 166 are implemented on administration server 158, the present invention is not limited to such an embodiment. In an alternate embodiment, rules deduction engine 164 and/or rules merger 166 may be located on each of the site collectors 132. In such an embodiment, administration server 158 would download CDR-based rules directly to each site collector. The rules deduction engine 164 executing on each site collector would automatically deduce MSU-based filtering rules from the CDR-based criteria specified by the user in the manner described above. Rules merger 166 would then merge the new rules with the existing rule set to create the non-redundant, multi-application message streams from each site collector. Thus, the concepts of rules deduction and rules merging according to the present invention are not limited to being performed at any particular location in the network.

Thus, as described above, the methods and systems of the present invention automatically deduce MSU-based filtering rules from CDR-based filtering rules, update CDR rule sets on-the-fly, and define the rule sets such that bandwidth in a service providers internal data network is conserved. The ability to deduce rules reduces the likelihood of errors in implementing rule changes. The ability to automatically update a rules database on-the-fly reduces down time. Finally, the steps described herein for conserving bandwidth on the service provider's network reduce infrastructure costs.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for decreasing bandwidth consumed by a network data collection system, the method comprising:
   (a) generating signaling message filter rule sets for a plurality of different network data collection applications;
   (b) downloading the signaling message filter rule sets to a plurality of signaling message site collectors;
   (c) at the signaling message site collectors, collecting signaling messages based on the signaling message filter rule sets;
   (d) from each signaling message site collector, forwarding a non-redundant, multi-application stream of signaling message parameters to a data gateway server, wherein the non-redundant multi-application stream includes a superset of signaling message parameters required by the plurality of network data collection applications and thereby avoids parameter duplication in the stream; and
   (e) at the data gateway server, creating a common CDR for the plurality of different applications based on the stream.

2. The method of claim 1 wherein generating signaling message filter rule sets includes receiving CDR-based filter criteria from a user and automatically deducing signaling-message-based rule sets from the CDR-based filter criteria.

3. The method of claim 1 wherein generating signaling message filter rule sets includes merging the rule sets for the applications to form a combined rule set including a superset of signaling-message-based filtering rules required by the network data collection applications.

4. The method of claim 3 wherein automatically combining the rule sets includes logically combining the rule sets.

5. The method of claim 4 wherein logically combining the rule sets includes ANDing AND-based rules and ORing OR-based rules.

6. The method of claim 1 wherein downloading signaling message filter rule sets for a plurality of different applications includes downloading signaling message filter rule sets for at least one of: a billing application, a mass call detection application, a fraud detection application, and a billing verification application.

7. The method of claim 1 comprising, at the data gateway server, correlating the signaling message parameters into user-defined call detail records for the applications.

8. The method of claim 7 wherein correlating the signaling message parameters into user-defined call detail records includes correlating the signaling message parameters into at least one of: call answered CDRs, long duration call CDRs, and end of call CDRs.

9. The method of claim 1 wherein collecting signaling messages includes collecting SS7 message signal units.

10. The method of claim 1 wherein collecting signaling messages includes collecting TCP/IP-encapsulated SS7 messages.

11. The method of claim 1 wherein collecting signaling messages includes collecting SCTP/IP-encapsulated SS7 messages.

12. The method of claim 1 wherein collecting signaling messages includes collecting session initiation protocol (SIP) messages.

13. The method of claim 1 wherein collecting signaling messages includes collecting H.225 messages.

14. The method of claim 1 wherein collecting signaling messages includes collecting media gateway control protocol (MGCP) messages.

15. A method for defining and dynamically updating signaling message filters associated with a plurality of site collectors in a network data collection system, the method comprising:
   (a) filtering signaling messages at a plurality of network site collectors based on an existing signaling-message-based rule set defined in the site collectors;
   (b) at an administration server located remotely from the site collectors, receiving CDR-based filter criteria from a user;
   (c) automatically converting the COR-based filter criteria into a new signaling-message-based filter rule set;
   (d) distributing the new signaling-message-based filter rule set to the site collectors; and
   (e) at the site collectors, switching to the new rule set on-the-fly and filtering signaling messages based on the new rule set.

16. The method of claim 15 wherein receiving CDR-based filter criteria includes receiving filter criteria for filtering CDRs of interest to a particular application.

17. The method of claim 15 wherein converting the CDR-based filter criteria into a signaling-message-based filter rule set includes deducing MSU-based filtering rules based on CDR-based filtering rules and deducing outgoing MSU-based filtering rules based on incoming MSU-based filtering rules.

18. The method of claim 15 wherein distributing the signaling-message-based filtering rule set to the site collectors includes:
   (a) downloading the signaling-message-based filtering rule set to each of the site collectors;
   (b) notifying the site collectors of the new signaling-message-based filtering rule set; and
   (c) at the site collectors, automatically installing the new rule set.

19. The method of claim 18 wherein notifying the site collectors of the new rule set includes setting a flag in the local database at each of the site collectors.

20. The method of claim 15 wherein receiving CDR-based filter criteria includes receiving CDR-based filter criteria for a plurality of different network data collection applications.

21. The method of claim 20 wherein automatically converting the CDR-based filter criteria into a new signaling-message-based filter rule set includes combining the CDR-based filter criteria for the different network monitoring applications into a rule set including a superset of signaling messages required by the different network data collection applications.

22. The method of claim 21 wherein combining the rule sets includes logically combining the rule sets.

23. The method of claim 22 wherein logically combining the rule sets includes ANDing AND-based rules and ORing OR-based rules.

24. A system for delivering call detail records to a plurality of different network data collection applications, the system comprising:
  (a) a plurality of site collectors for receiving copies of signaling messages from link monitors, each site collector including a filter application for filtering the signaling messages and for creating a non-redundant, multi-application stream of signaling message parameters, wherein the non-redundant, multi-apnlication stream includes a superset of signaling message parameters required by the plurality of network data collection applications and thereby avoids parameter duplication in the stream; and
  (b) a data gateway server operatively associated with the site collectors for receiving the non-redundant, multi-application streams of signaling message parameters from the site collectors, for correlating the signaling message parameters received from the site collectors into call detail records for a plurality of different network monitoring applications, and for delivering the call detail records to the network monitoring applications.

25. The system of claim 24 wherein each of the site collectors includes message filter tables containing signaling message filtering rules used by the filter application to create the non-redundant, multi-application, streams of signaling message parameters.

26. The system of claim 25 wherein the message filter tables each contain signaling message filtering rule sets, wherein each signaling message filtering rule set is a superset of the signaling message filtering rules required by the different network monitoring applications.

27. The system of claim 24 wherein the data gateway server includes a correlator for correlating the streams of signaling message parameters into the call detail records.

28. The system of claim 27 wherein the correlator is adapted to generate at least one of: call answered CDRs, end of call CDRs, and long duration call CDRs.

29. The system of claim 24 wherein the site collectors and the data gateway server are connected to each other via a wide area network.

30. The system of claim 24 comprising an administration server for downloading message filtering rule sets to the site collectors.

31. The system of claim 30 wherein the administration server comprises:
  (a) a rules editor for receiving CDR-based filter criteria from a user;
  (b) a rules deduction engine for automatically deducing MSU-based filter criteria from the CDR-based filter criteria; and
  (b) a rules merger for merging the CDR-based filter criteria into a combined rule set including a superset of MSU-based filter criteria for the plurality of network monitoring applications.

32. An administration server for a network data collection system, the administration server comprising:
  (a) a rules editor for receiving CDR-based filter criteria from a user;
  (b) a rules deduction engine for receiving the CDR-based filter criteria from the rules editor and automatically converting the CDR-based filter criteria into signaling-message-based filtering rules; and
  (c) a rules merger for automatically merging the signaling-message-based rules into a combined rule set including a superset of signaling-message-based filtering rules for a plurality of different network monitoring applications.

33. The server of claim 32 wherein the rules deduction engine is adapted to determine incoming signaling-message-based filter criteria based on outgoing message-based filter criteria.

34. The server of claim 32 wherein the rules merger is adapted to logically combine the signaling-message-based filtering rules.

35. The server of claim 33 wherein the rules merger is adapted to logically AND AND-based signaling-message-based rules and logically OR OR-based signaling-message-based rules.

36. The server of claim 32 comprising a database for storing the signaling-message-based filtering rules.

37. The server of claim 36 comprising a synchronization server operatively associated with the rules merger for distributing the signaling-message-based filtering rules to a plurality of site collectors.

38. The method of claim 15 wherein the CDR-based filter criteria include a type of CDR desired by the user.

39. The server of claim 32 wherein the CDR-based filter criteria include a type of CDR desired by the user.

* * * * *